(12) United States Patent
Liu

(10) Patent No.: US 7,352,299 B1
(45) Date of Patent: *Apr. 1, 2008

(54) METHOD AND SYSTEM FOR IMPROVING MEMORY INTERFACE DATA INTEGRITY

(75) Inventor: Hui Liu, Pleasanton, CA (US)

(73) Assignee: Altera Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/560,673

(22) Filed: Nov. 16, 2006

Related U.S. Application Data

(63) Continuation-in-part of application No. 11/142,732, filed on May 31, 2005, now Pat. No. 7,102,544.

(51) Int. Cl.
 *H03M 7/00* (2006.01)
(52) U.S. Cl. .......................................... 341/51; 341/50
(58) Field of Classification Search ............... 341/5–90
 See application file for complete search history.

(56) References Cited

U.S. PATENT DOCUMENTS

| | | | |
|---|---|---|---|
| 5,526,199 A * | 6/1996 | Seki et al. ................... 360/48 |
| 6,654,562 B1 * | 11/2003 | Murata ........................ 341/94 |
| 6,950,448 B2 * | 9/2005 | Tornetta et al. ............. 370/537 |
| 7,102,544 B1 * | 9/2006 | Liu .............................. 341/51 |
| 7,113,703 B2 * | 9/2006 | Murata ........................ 398/79 |

* cited by examiner

*Primary Examiner*—Lam T. Mai
(74) *Attorney, Agent, or Firm*—Martine Penilla & Gencarella, LLP

(57) ABSTRACT

An integrated circuit (IC) for optimizing data presentation to an external memory interface bus is provided. The IC is in communication with the external memory via the external memory interface bus. The IC includes an encoder that may encode the data that are being sent to an external memory. The encoder encodes the data based on the logic value of the majority of bits in the data. The encoder sets a status bit to indicate that the data are encoded. The encoder includes two encoding stages to further enhance the data integrity and transfer. Further connected in series with the encoder is a parity generator that sets the parity bit logic value based on whether the number of logic 1s in the data, including the status bit, is even or odd. The IC also includes a parity checker to detect whether any error occurred in the data during transmission. The decoder within the IC decodes the data to the original data. The decoder is connected in series with the parity checker.

20 Claims, 10 Drawing Sheets

METHOD AND SYSTEM FOR IMPROVING MEMORY INTERFACE DATA INTEGRITY

CLAIM OF PRIORITY

This application is a continuation-in-part application and claims priority from U.S. patent application Ser. No. 11/142,732, filed on May 31, 2005 now U.S. Pat. No. 7,102,544, entitled "METHOD AND SYSTEM FOR IMPROVING MEMORY INTERFACE DATA INTEGRITY IN PLDS," which is herein incorporated by reference in its entirety for all purposes.

BACKGROUND

A programmable logic device (PLD) generally includes at least one memory, which may be located external to or embedded in the PLD. When the memory is located external to the PLD, the PLD is provided with an external memory interface bus that can be used for communicating with the external memory. The data are transmitted to/from the PLD from/to the external memory via the external memory interface bus. During transmission, bits in the data might be switching states. When a large number of bits in the data simultaneously switch states, this can result in noise. The effect of simultaneous switching states is commonly referred to as a simultaneous switching output (SSO) effect. The noise generated by the SSO effect can cause signal integrity problems thereby causing corruption of data. Additionally, the error detection schemes used in digital circuits generally do not provide any means for detecting the errors, which may occur to bits in the data that indicate such process as encoding.

Accordingly, there exists a need for a system and a method for a PLD with an external memory that minimizes SSO effect. Also, there exists a need to detect errors that may occur to bits in the data that indicate such process as encoding.

SUMMARY

Broadly speaking, the present invention fills these needs by providing a method and system for presenting data to an external memory interface bus in an optimized way. According to the embodiments of the invention, the data, which are sent from a PLD to an external memory, are encoded based on the logic value of the majority bits. Further, the error detection logic is connected in series with the encoder so that the status bit signifying the encoding may also be included in the error detection scheme. Therefore, any error that may occur in the status bit may also be detected. Also, the structure formed by the combination of having encoding in series with the error detection scheme reduces the SSO effect.

In one aspect of the invention, an integrated circuit (IC) for optimizing data presentation to an external memory interface bus is provided. The IC is in communication with the external memory via the external memory interface bus. The IC includes an encoder that may encode the data that are being sent to an external memory. The encoder encodes the data based on the logic value of the majority of bits in the data. The encoder sets a status bit to indicate that the data are encoded. The encoder includes two encoding stages to further enhance the data integrity and transfer. Further connected in series with the encoder is a parity generator that sets the parity bit logic value based on whether the number of logic 1s in the data, including the status bit, is even or odd.

The IC also includes a parity checker to detect whether any error occurred in the data during transmission. The decoder within the IC decodes the data to the original data. The decoder is connected in series with the parity checker.

In another aspect of the invention, a method for optimizing data presentation on an external memory interface bus for a programmable logic device (PLD) is provided. The method includes encoding the data to be sent to an external memory and setting the status bit to a particular logic value to indicate that the data are encoded. The determination to encode is based on the logic value of the majority of bits in the data. The encoding may involve inverting the data bits and may include multiple encoding stages. In the multiple encoding stages different portions of the bit sequence may be encoded between the first and the second stages. Subsequent to encoding, the data parity bit is set to a particular logic value based on a number of particular logic value types in the data along with the status bit. The optimized data are sent to the external memory through the external memory interface bus.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

An invention for optimized data presentation to an external memory interface bus is provided. The embodiments of the present invention monitor the bits in the data, and based on the type of bits that the majority of the bits in the data belong to, determine whether the data are to be encoded in each of two stages. When the data are encoded, the status bit is set to a particular logical value. After that, the parity generator counts the number of logic high values, e.g., logical 1's in the data, including the status bit, and sets the parity bit to a logical one or a logical zero based on whether the number of logical high values in the data is even or odd. The parity generator generates the parity bit in series with the encoder scheme, which not only helps to ensure integrity of the data but also ensures the integrity of the status bit.

Figure 1:
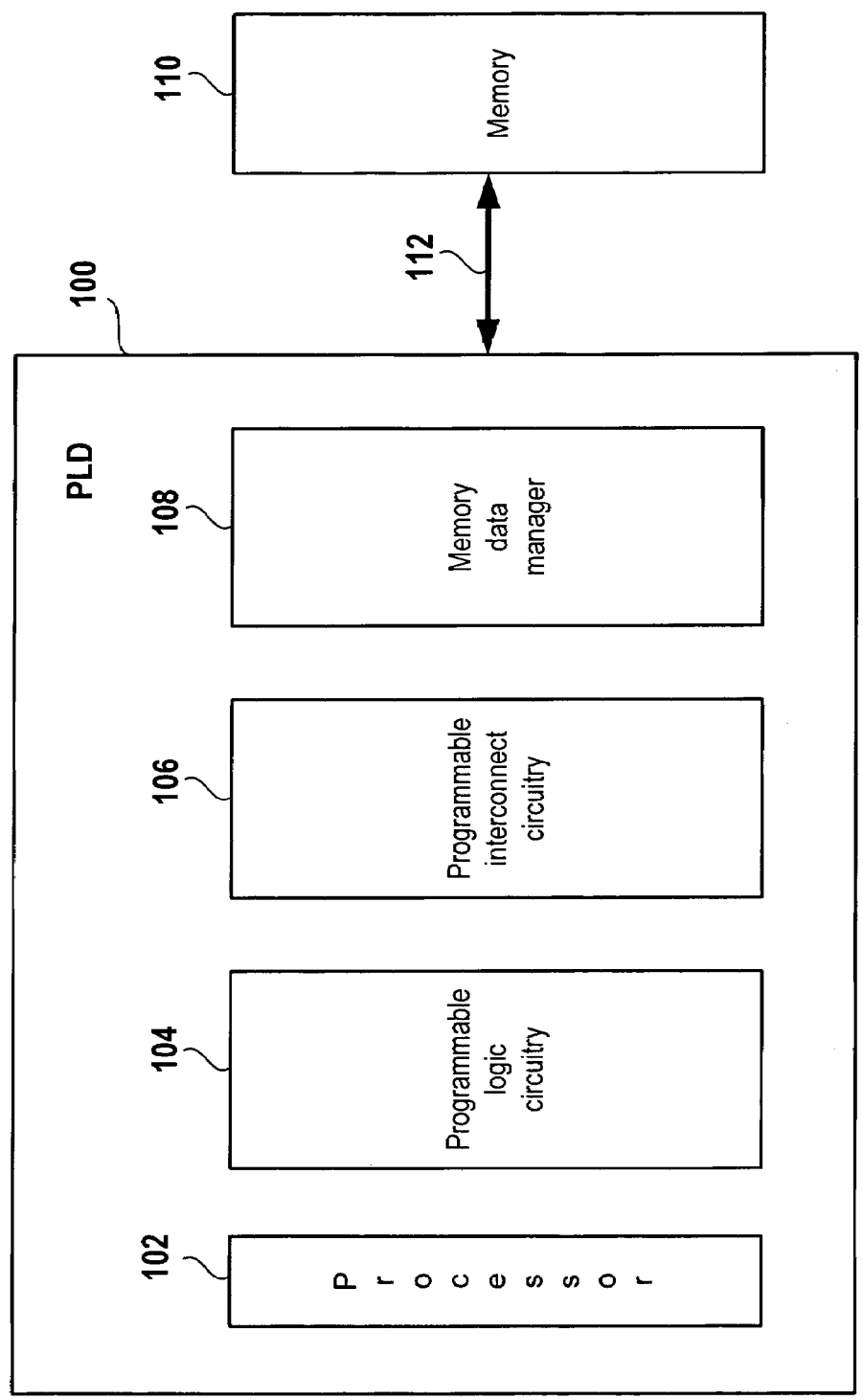
FIG. 1 is a high-level diagram of a PLD including an external memory in accordance with an embodiment of the present invention.

FIG. 1 shows a general block diagram of a PLD 100 in accordance with an embodiment of the present invention. PLD 100 includes processor 102, programmable logic circuitry 104, programmable interconnect circuitry 106, and memory data manager 108. PLD 100 illustrated herein may include other blocks and circuitry, as persons of ordinary skill in the art understand. Examples of such circuitry include clock generation and distribution circuits, communication circuitry and/or controllers, input/output circuitry, and the like. As one skilled in the art should understand, the PLD 100 may include more than one processor. Additionally, processor 102 may couple to other blocks and circuits within or external to the PLD 100. Processor 102 may receive data from circuits within or external to the PLD 100 and process the information in a variety of ways.

Programmable logic circuitry 104 may include a varying number of logic elements (LEs) (not shown), which are basic building blocks of a PLD. Programmable logic circuitry may further include look up tables (LUT), product-term logic, multiplexers, logic gates, registers, memory and the like, that are necessary elements that perform desired logic functions. Programmable interconnect circuitry 106 couples to programmable logic circuitry 104 and provides configurable interconnects between various elements within the programmable logic circuitry 104 and other circuitry within or outside the PLD. Although shown as a block, the interconnect circuitry 106 may represent a plurality of signal conductors and may be dispersed throughout PLD 100.

Memory data manager 108 communicates with external memory 110 through external memory interface bus 112. Examples of external memory 110 may include random access memory (RAM), dynamic random access memory (DRAM), synchronous DRAM (SDRAM), magnetic RAM (MRAM), static RAM (SRAM), FLASH, programmable ROM (PROM), erasable PROM (EPROM), dual-in-line memory modules (DIMMs), etc. It should be appreciated that the external memory interface bus 112 may be a digital interface bus. In addition, one skilled in the art should understand that external memory interface bus 112 might be of any suitable size.

When memory data manager 108 sends or receives data to/from the external memory 110, the bits in the data may switch states from logic 1 to logic 0 or logic 0 to logic 1 simultaneously, while being transmitted on external memory interface bus 112. This simultaneous switching of states can cause the SSO effect. Therefore, the embodiments of the present invention present the data to external memory interface bus 112 in an optimized manner in order to minimize the number data bits switching states simultaneously.

Figure 2:
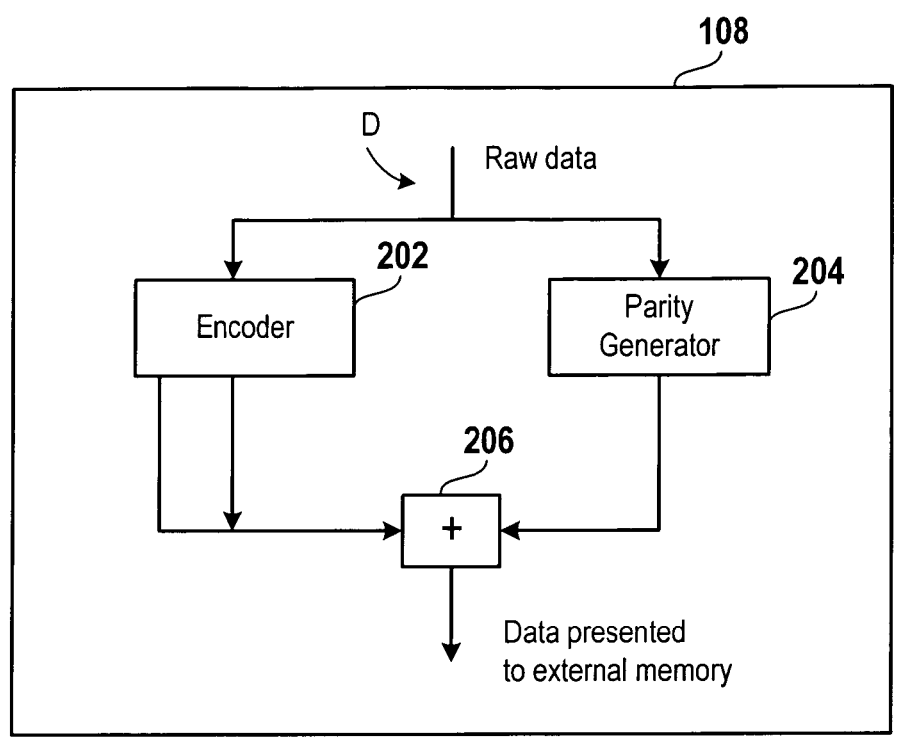
FIG. 2 shows a block diagram of a memory data manager.

FIG. 2 illustrates a block diagram of the memory data manager 108. Memory data manager 108 includes encoder 202 and parity generator 204 in parallel with each other. Raw data D are simultaneously sent to both the decoder 202 and the parity generator 204. The parity bit generated by the parity generator 204 is combined with the output data from encoder 202 at combiner 206 and are presented to the external memory 110 of FIG. 1 via external memory interface bus 112 of FIG. 1. One of the drawbacks of this arrangement is that the status bit generated by the encoder 202, to indicate encoding of the data, is not included in the raw data D sent to the parity generator 204. Thus, any error that may occur with the status bit will go undetected.

Figure 3:
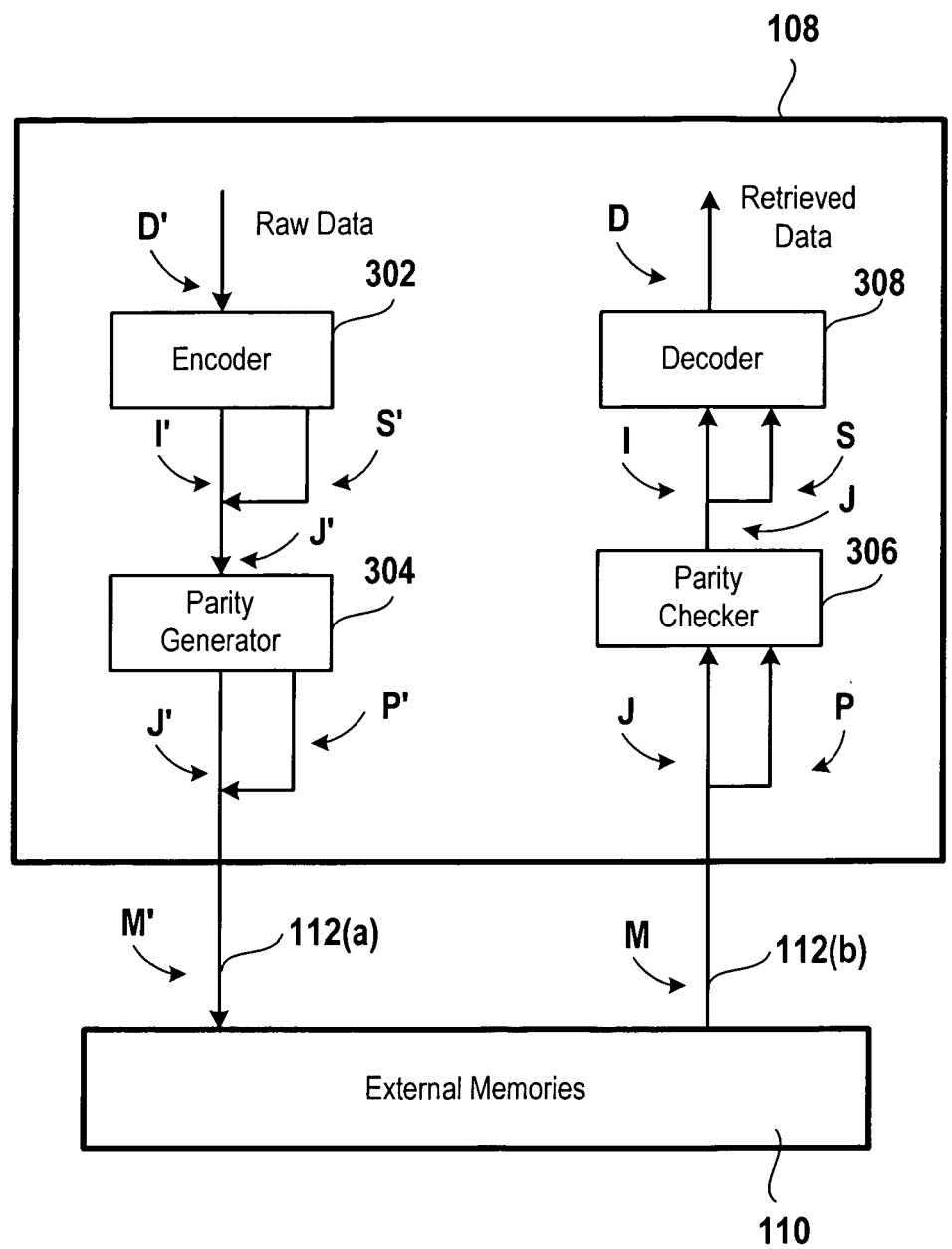
FIG. 3 illustrates a block diagram of a memory data manager in accordance with an embodiment of the present invention.

FIG. 3 illustrates a block diagram of a memory data manager 108 in accordance with an embodiment of present invention. Memory data manager 108 includes an encoder 302, parity generator 304, parity checker 306, and decoder 308. Memory data manager 108 is in communication with external memory 110 via external memory interface bus 112(a) and 112(b). Even though shown as two buses, external memory interface buses 112(a) and 112(b) may be a single bus. Raw data D' are sent from memory data manager 108 to the external memory 110. When the majority of bits in raw data D' may be classified as a particular type of logical value, the data being sent gets encoded by the encoder 302. The data from the encoder are shown as data I'.

As described above, a large number of bits switching states can lead to the SSO effect. Therefore, the encoder 302 encodes the data to prevent the majority of bits in the data from having a logical high value. The encoder 302 is also programmed to set a status bit S' to logic 1, to indicate that the data are encoded. Data I' and status bit S' are combined to form data J'. If the majority of the bits in the data are not of a particular logic type then the data are not encoded by the encoder 302 and the status bit S' is set to logic 0. One skilled in the art should understand that encoder 302 may be programmed to set the status bit S' to either 0 or 1 to indicate that the data are encoded.

Still referring to FIG. 3, memory data manager 108 includes parity generator 304. Parity generator 304 generates a parity bit P' based on the number of logic 1s in the data J'. Data J' and parity bit P' form data M'. In one embodiment, parity generator 304 is an odd parity generator, which implies that the parity generator 304 counts the number of logical high values, i.e., logical 1s in this case, in the data and sets parity bit P' to a logical high value if the number of logical high values in the data are odd. Conversely, if the number of logical high values in the data are even, the parity generator 304 sets the parity bit P' to a logical low value. In another embodiment, parity generator 304 is an even parity generator, in which case the parity generator 304 counts the number of logical high values in the data and sets the parity bit P' to logical high value if the number of logical high values in the data are even.

As can be seen in FIG. 3, encoder 302 and parity bit generator 304 are connected in series. Therefore, the parity bit generator 304 sets the panty bit P' based on the number of logical high values in the data J' inclusive of the status bit S' and data I'. Thus, any error that may occur in the status bit S' can be detected. Accordingly, when a request is generated within processor 102 of FIG. 1 to send data to external memory 110, the data M' of FIG. 3 is presented to the external memory interface bus 112(a) with a status bit S' and the parity bit P' set to a certain logic value so that any error that may occur due to the noise generated by the SSO effect can be detected. One skilled in the art should understand that even though a parity bit scheme is described above, other forms of error detection schemes may be used in series with the encoder for detecting error, such as a Hamming code.

Subsequently, when a request is generated within processor 102, of FIG. 1, to retrieve the data stored in external memory 110, the data M of FIG. 3 stored in external memory 110 are sent to parity checker 306 within memory data manager 108. Data M include status bit S, parity bit P, and data I. The data M which are retrieved from external memory 110 may or may not be the same as the data M' that were presented to the external memory interface bus 112(a). For example, if an error has occurred, then the data M will be different from the data M'. The parity checker 306 separates data M to parity bit P and data J. The parity checker 306 further checks the parity bit P to determine if data J received from the external memory 110 have any parity error. For example, in case of an odd parity checker, if the number of logical high values in data J is odd, and the parity bit P is a logical high value, which implies there is no error in the data. Similarly, if the number of logical high values in data J is even and the parity bit P is a logical low value, then this implies no error has occurred during transmission. One skilled in the art will appreciate that if the number of logical high values and the parity bit logical value do not correspond, then an error will be generated.

FIG. 3 is further shown to include decoder 308 connected in series with the parity checker 306. Decoder 308 separates data J to get status bit S and data I. Decoder 308 further checks the status bits to determine whether the data have been encoded. If the status bit S indicates that the data have been encoded, then the decoder 308 decodes the data to get data D. On the other hand, if status bit S indicates that the data have not been encoded, then the data I are not decoded by the decoder 308 i.e., the data D are the same as data I. In one embodiment, decoder 308 does not decode the data if the parity checker determines that an error has occurred in the data. Alternatively, the decoder 308 may decode the data even if an error has occurred so that the design engineers can determine where the error is and find ways to recover the data. One skilled in the art will appreciate that the same convention described above, with respect to FIG. 3, may be used consistently with logical low values. For example, the encoder 302 may be set up to encode the data if the majority of the bits in the data are logical low values, e.g., a logical 0.

Figure 4:
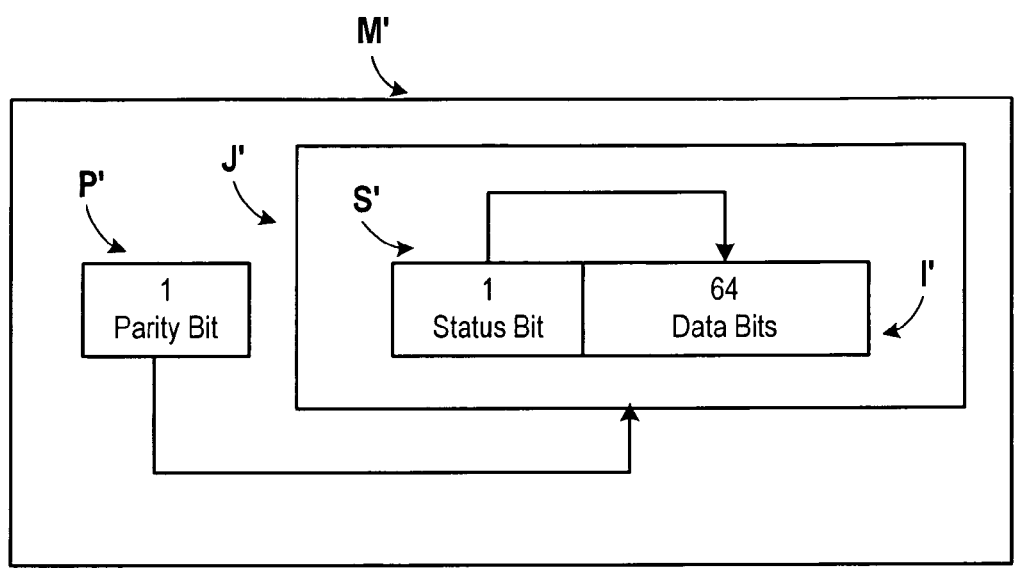
FIG. 4 shows an exemplary optimized data, as presented to the external memory interface bus, in accordance with an embodiment of the invention.

FIG. 4 shows an exemplary data structure for data M', as presented to the external memory interface bus 112(a), described in FIG. 3 in accordance with an embodiment of the invention. Data M', as shown, include parity bit P', status bit S', and data bits I'. One skilled in the art should understand that, even though data M' are shown to include total of 18 bits the number of bits in data M' can vary depending on the external memory interface bus size. Thus, the 18 bit size depicted in FIG. 4 is exemplary and not meant to be limiting. As described above, parity bit P' is set to a particular logical value based on the number of logical high values in data J', which includes the status bit S' and data bits I'. Consequently, errors that may occur to status bit during transmission can be detected.

Figure 5:
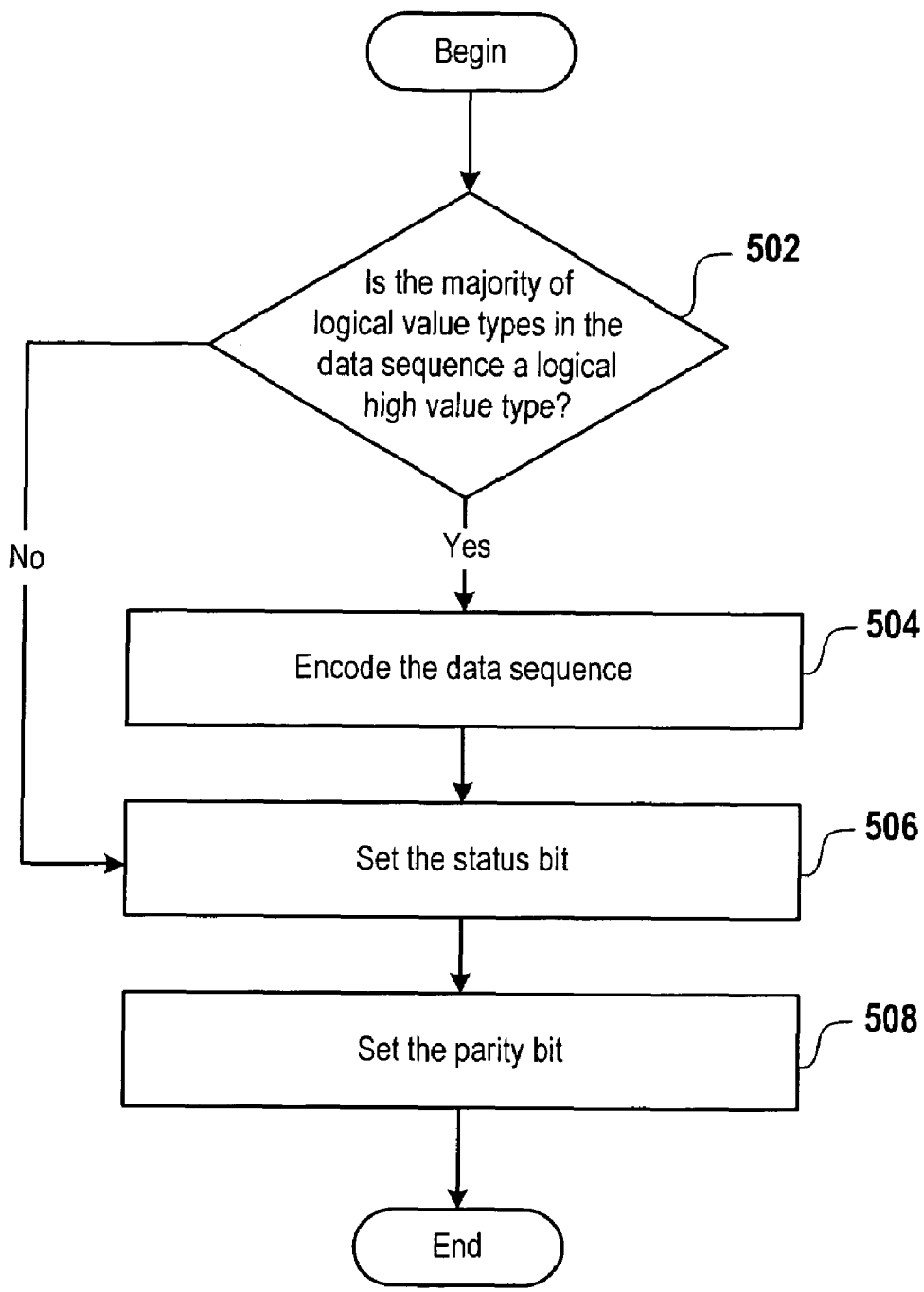
FIG. 5 is a flow chart illustrating the method of operations involved in providing an optimized data presentation to an external memory interface bus in accordance with an embodiment of the invention.

FIG. 5 is a flow chart illustrating the method of operations involved in providing an optimized data presentation to an external memory interface bus, in accordance with an embodiment of the invention. The method begins with operation 502, where a determination is made as to whether the majority of bits within the data sequence are of logical high value or logical low value. If the majority of bits are of logical high values, then the data sequence is encoded as described in operation 504. In one embodiment, the encoding involves inverting the bits in the data. Inverting, as described herein, involves changing the logical high values to logical low values and vice versa. Once the data sequence is encoded, the status bit is set to a particular logic value as indicated in operation 506. As mentioned above, the status bit may be set to either a logical high or low value.

If the majority of bits in the data sequence is not a logical high value type in operation 502, then the data sequence is not encoded and the method advances to operation 506, where the status bit is set accordingly. Thus, if the majority of bits in the data sequence are not a logical high value type, then the data is maintained in an unencoded format. Next, in operation 508, the parity bit is set either to a logical high or logical low value based on the number of logical high values in the data sequence. As indicated above, the parity bit value is computed based on the number of logical high values in the data sequence, which includes the status bit. Thus, the parity bit not only detects any error that may occur in the data sequence, but also detects any error that may occur in the status bit. It should be appreciated that while the method of operation 502 referenced the majority of logical value types in the data sequence as being a logical high value type, this reference is not meant to be limiting. That is, the method of operations listed above may be modified so that the data is encoded if the majority of logical value types are logical low value types.

Tables 1 and 2, through exemplary data, further illustrate the embodiments described above with respect to FIG. 5 and FIG. 3.

TABLE 1

| | | |
|---|---|---|
| D' | 1111.1111.0011.1000 | 16-bit data with 11 logic 1s |
| I' | 0000.0000.1100.0111 | inverted |
| S' | 1 | indicates the data are inverted |
| J' | 1.0000.0000.1100.0111 | J' = {S', I'} |
| P' | 0 | number of logic 1s in J' is 6, an even number |
| M' | 01.0000.0000.1100.0111 | M' = {P', J'}, with 6 logic 1s |

Table 1 shows data D' to be a 16 bit data value having 11 bits with logical high values, i.e., is. As described above in operation 504, the raw data D' are encoded because the majority of the bits 11/16 in raw data D' is a logical high value. One skilled in the art will appreciate that the logic values of the majority of bits can be counted through various means. For example, the counting can be done through an adder, comparator, counter, etc. The exemplary encoding scheme used herein is to invert the data. By inverting, the bits in raw data D' resulted in data I'. As can be seen, in data I', only 5 bits out of the 16 bits are logical high values. Since the data D' are inverted, the status bit S' is set to a logical high value, i.e., 1, to indicate that the data are encoded. Of course, the status bit S' may be set to a logical low value to indicate the data are encoded under an alternative convention. Status bit S' with the encoded data I combine to define data J'. Data J' include 17 bits. Further, the parity generator in the example is assumed to be an odd parity generator. Thus, parity bit P' is set to logic 0 because the number of logic is in data J' is even, i.e. 6. As mentioned earlier, with reference to FIG. 3, data M' are generated by combining data J' with the parity bit P'. One of the advantages of presenting data M' to external memory interface bus is that the parity bit P' is computed based on the number of logic 1s in data J' where data J' include encoded data I' and status bit S'. Thus, the status bit S' is included in the error detection process so that any error that may occur to status bit S' as well as the data I' may be detected. Additionally, data M' only includes 6 logic 1s, therefore, less than half of the bits in the data M' will be simultaneously switching states from logic 1 to logic 0 or logic 0 to 1.

To illustrate the optimizing process further, three exemplary data sequences are shown below. The three data sequences are sent to the external memory at first, second and third clock cycle respectively. The exemplary first data sequence is 1111,1111,1000,0000. The exemplary second data sequence is 000,0000,0010,0111. The exemplary third data sequence is 1111,1111,1010,0010. As described above, since the majority of bits in the first and the third data sequences are logic 1s the bits are encoded. For exemplary purpose, the data sequences are encoded by inverting the bits. When the bits are inverted the first data sequence became 0000,0000,0111,1111, and the third data sequence became 0000,0000,0101,1101. The second data sequence will not be inverted since the majority of the bits in the second data sequences are not logic 1s. Therefore, the unencoded second data sequence will be sent to the external memory interface bus. At the first clock cycle, the encoded first data sequence are sent to the external memory interface bus, i.e., 0,1,0000,0000,0111,111 along with the status bit set to logical 1 and the parity bit set to logical 0. At the second clock cycle, the unencoded second data sequence, i.e., 0,0,0000,0000,0010,0111 is sent to the external memory interface bus with the status bit and the parity bit set to logical 0. When comparing bits in the corresponding bit positions between the encoded first data sequence and the second data sequence, it can be seen that only 4 bits are different. Thus, in this example, the state change occurs only for those 4 bits that are different and there is no state change for the rest of the bits.

Similarly, when the encoded third sequence 0,1,0000, 0000,0101,1101 is presented to the external memory interface bus, only those bits in the corresponding bit positions that are different from the second data sequence will change states. In this example, there are 6 bits that are different between the second data sequence and the third encoded data sequence, which implies there are 6 bits that will change state simultaneously. However, among the 6 bits that are different, four of them are changing states from logic 0 to logic 1 and the other two are changing states from logic 1 to logic 0. State changes from logic 1 to logic 0 i.e., a logical high state to a logical low state, do not have the same effect on the circuit as state changes from logic 0 to logic 1, i.e., a logical low state to a logical high state. Even though both state changes are a form of SSO effect, the effects of these two changes do not add. In some instances, the two different logic state changes may cancel each other. The worst SSO effect is experienced when a large number of state changes occur in the same direction. Therefore, in this example, the possible worst SSO effect is due to the four bits changing state from logic 1 to logic 0.

TABLE 2

| D' | 1111.0000.1111.0000 | 16-bit data with 8 logic 1s |
| I' | 1111.0000.1111.0000 | not inverted |
| S' | 0 | indicates the data are not inverted |
| J' | 0.1111.0000.1111.0000 | J' = {S', I'} |
| P' | 0 | number of logic 1s in J' is 8, an even number |
| M' | 00.1111.0000.1111.0000 | M' = {P', J'}, with 8 logic 1s |

Table 2 illustrates, through exemplary data, the embodiments described above with respect to FIG. 5 and FIG. 3 for the worst-case scenario. In table 2, the raw data D' that are being sent to the external memory contain an equal number of logic 1s and logic 0s. In this example, there are eight logic 1s and eight logic 0s. Since the data do not contain majority of logic 1s, the data are not encoded. Therefore, the data I' remain the same as the raw data D'. As the data are not encoded, status bit S' is set to logic 0. Data J' include both the raw data I' and status bit S'. As the number of logic is in data J' is even, the parity bit is set to logic 0. The optimized resulting data M', which are to be presented to the external memory interface bus include eight logical high values. As can be seen, in the worst case scenario, only 8 bits out of the 18 bits in data M' are logic 1s, which is $4/9^{ths}$ of the number bits in data M'. Therefore, in the worst case, only $4/9^{ths}$ of the total bits can switch states simultaneously from logic 1 to logic 0.

As can be seen, the embodiments described above, can prevent signal degradation caused by SSO effect. The SSO effect is reduced by encoding the data based on the number of logical high values in the data. Also, the embodiments described above are able to detect errors in the status bit by having the parity bit generator in series with the encoder. The parity bit is generated subsequent to the encoder setting the status bit to a particular logical value. Consequently, the data, from which the parity bit is generated, include the status bit. Thus, the status bit is included in the error detection scheme.

A two-stage encoding sequence may be provided as described in the figures below to further minimize degradation due to a SSO effect. The two-stage selective fixed length encoder (TSFE) and an odd-parity generator connected in series with the TSFE provides an optimal data presentation to an external memory interface for general data buses to improve data integrity in accordance with one embodiment of the invention. It should be appreciated that the TSFE design is based on the spatial property (locality property) of SSN events.

Figure 6:
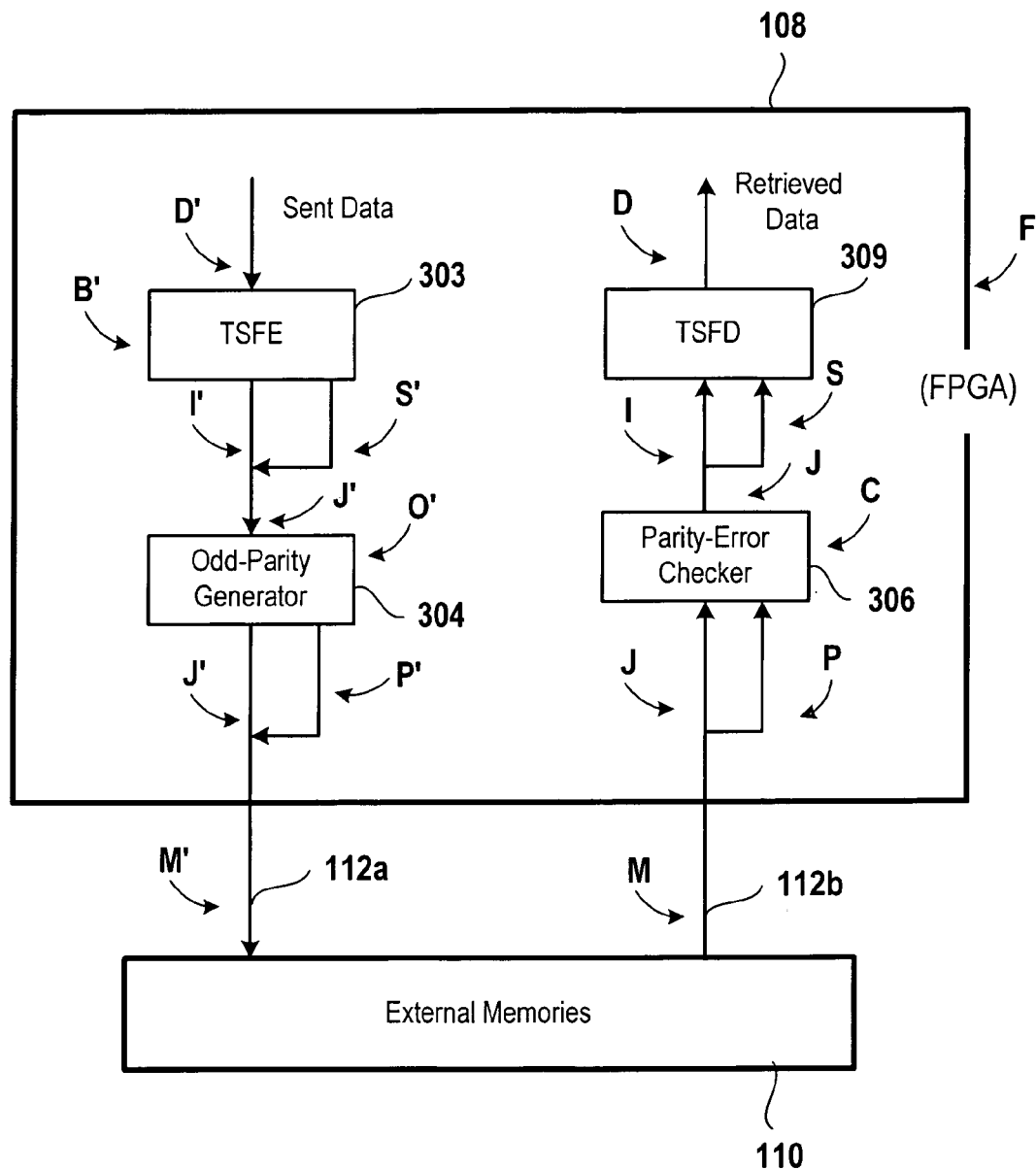
FIG. 6 is a simplified schematic diagram illustrating a memory data manager 108 and the data path inside a programmable logic device (PLD), such as an FPGA, in accordance with one embodiment of the invention.

FIG. 6 is a simplified schematic diagram illustrating a memory data manager 108 and the data path inside a programmable logic device (PLD), such as an FPGA, in accordance with one embodiment of the invention. TSFE 303 encoder consists of $2^{(n-4)}$ type-A bus inverters and $2^{(n-5)}$ type-B bus inverters for a data bus that has $2^n$ bits where n is an integer greater than four in one embodiment. In this embodiment, the type-A bus inverter is a fixed length 16 bit inverter that inverts its input data if the number of logic ones, i.e., logical high values, in the bit sequence representing the input data is larger than 8. A status bit with a value of logic 1 is added to indicate the input data has been inverted. Otherwise, the data is not inverted, and the added status bit would have a logic value zero to indicate the non-inverted state. A type-B bus inverter is also included in TSFE 303 and is a fixed length 16-bit inverter that inverts its input data if the number of logic ones and the data is larger than 10 and adds a status bit of logic one. Otherwise, the data is not inverted, and the added status bit would have a logic value zero to indicate the non-inverted state. The type-B inverter is the second stage of TSFE 303, while the type-A inverter is the first stage as explained in more detail below. It should be noted that all the data of width $2^n$ bits, where n is greater than four, is portioned/selected as illustrated in more detail below with reference to FIG. 7. Memory data manager 108 includes TSFE 303, parity generator 304, parity checker 306, and two-stage selective fixed length decoder 309. Memory data manager 108 is in communication with external memory 110 via external memory interface buses 112(a) and 112(b). Even though shown as two buses, external memory interface buses 112(a) and 112(b) may be a single bus. Raw data D' is sent from memory data manager 108 to the external memory 110. When the majority of bits in raw data D' may be classified as a particular type of logical value, the data being sent is encoded by the TSFE 303. The data from TSFE 303 is shown as data I'.

As described above, a large number of bits switching states can lead to the SSO effect. Therefore, TSFE 303 encodes the data to prevent the majority of bits in the data from having a logical high value. TSFE 303 is also programmed to set a status bit S' to logic 1, to indicate that the data is encoded. Data I' and status bit S' are combined to form data J'. If the majority of the bits in the data are not of a particular logic type then the data is not encoded by TSFE 303 and the status bit S' is set to logic 0. One skilled in the art should understand that TSFE 303 may be programmed to set the status bit S' to either 0 or 1 to indicate that the data is encoded.

Still referring to FIG. 6, memory data manager 108 includes parity generator 304. Parity generator 304 generates a parity bit P' based on the number of logic 1's in the data J'. Data J' and parity bit P' form data M'. I one embodiment, parity generator 304 is an odd parity generator, which implies that parity generator 304 counts the number of logical high values, i.e., logical 1', in the data and sets parity bit P' to a logical high value if the number of logical high values in the data are odd. Conversely, if the number of logical high values in the data are even, parity generator 304 sets the parity bit P' to a logical low value. In another embodiment, parity generator 304 is an even parity generator, in which case parity generator 304 counts the number of logical high values in the data and sets the parity bit P' to logical high value if the number of logical high values in the data are even.

As can be seen in FIG. 6, TSFE 303 and parity bit generator 304 are connected in series. Therefore, the parity bit generator 304 sets the parity bit P' based on the number of logical high values in the data J' inclusive of the status bit S' and data I'. Thus, any error that may occur in the status bit S' can be detected. Accordingly, when a request is generated within processor 102 of FIG. 1 to send data to external memory 110, the data M' of FIG. 6 is presented to the external memory interface bus 112(a) with a status bit S' and the parity bit P' set to a certain logic value so that any error that may occur due to the noise generated by the SSO effect can be detected. One skilled in the art should understand that even though a parity bit scheme is described above, other forms of error detection schemes may be used in series with the encoder for detecting error, such as a Hamming code.

Subsequently, when a request is generated within processor 102, of FIG. 1, to retrieve the data stored in external memory 110, the data M of FIG. 6 stored in external memory 110 is sent to parity checker 306 within memory data manager 108. Data M includes status bit S, parity bit P, and data I. The data M which are retrieved from external memory 110 may or may not be the same as the data M' that were presented to the external memory interface bus 112(a). For example, if an error has occurred, then the data M will be different from the data M'. The parity checker 306 separates data M to parity bit P and data J. The parity checker 306 further checks the parity bit P to determine if data J received from the external memory 110 have any parity error. For example, in case of an odd parity checker, if the number of logical high values in data J is odd, and the parity bit P is a logical high value, which implies there is no error in the data. Similarly, if the number of logical high values in data J is even and the parity bit P is a logical low value, then this implies no error has occurred during transmission. One skilled in the art will appreciate that if the number of logical high values and the parity bit logical value do not correspond, then an error will be generated.

FIG. 6 is further shown to include TSFD 309 connected in series with the parity checker 306. TSFD 309 separates data J to get status bit S and data I. TSFD 309 further checks the status bits to determine whether the data have been encoded. If the status bit S indicates that the data have been encoded, then TSFD 309 decodes the data to get data D. On the other hand, if status bit S indicates that the data have not been encoded, then the data I are not decoded by TSFD 309, i.e., the data D are the same as data I. In one embodiment, TSFD 309 does not decode the data if the parity checker determines that an error has occurred in the data. Alternatively, TSFD 309 may decode the data even if an error has occurred so that the design engineers can determine where the error is and find ways to recover the data. One skilled in the art will appreciate that the same convention described above, may be used consistently with logical low values. For example, TSFE 303 may be set up to encode the data if the majority of the bits in the data are logical low values, e.g., a logical 0. It should be noted that while further details below focus on the architecture of TSFE 303, the architecture of TSFD 309 is complimentary. That is, TSFD 309 will undo the encoding of TSFE 303. For example, in the first stage of TSFD 309, a type-B inverter would accomplish the first stage decoding and the type-A decoders would accomplish the second stage decoding. Accordingly, it is unnecessary to go into the details of TSFD 309, as one skilled in the art would readily understand the architecture based on the discussion of TSFE 303 herein.

Figure 7:
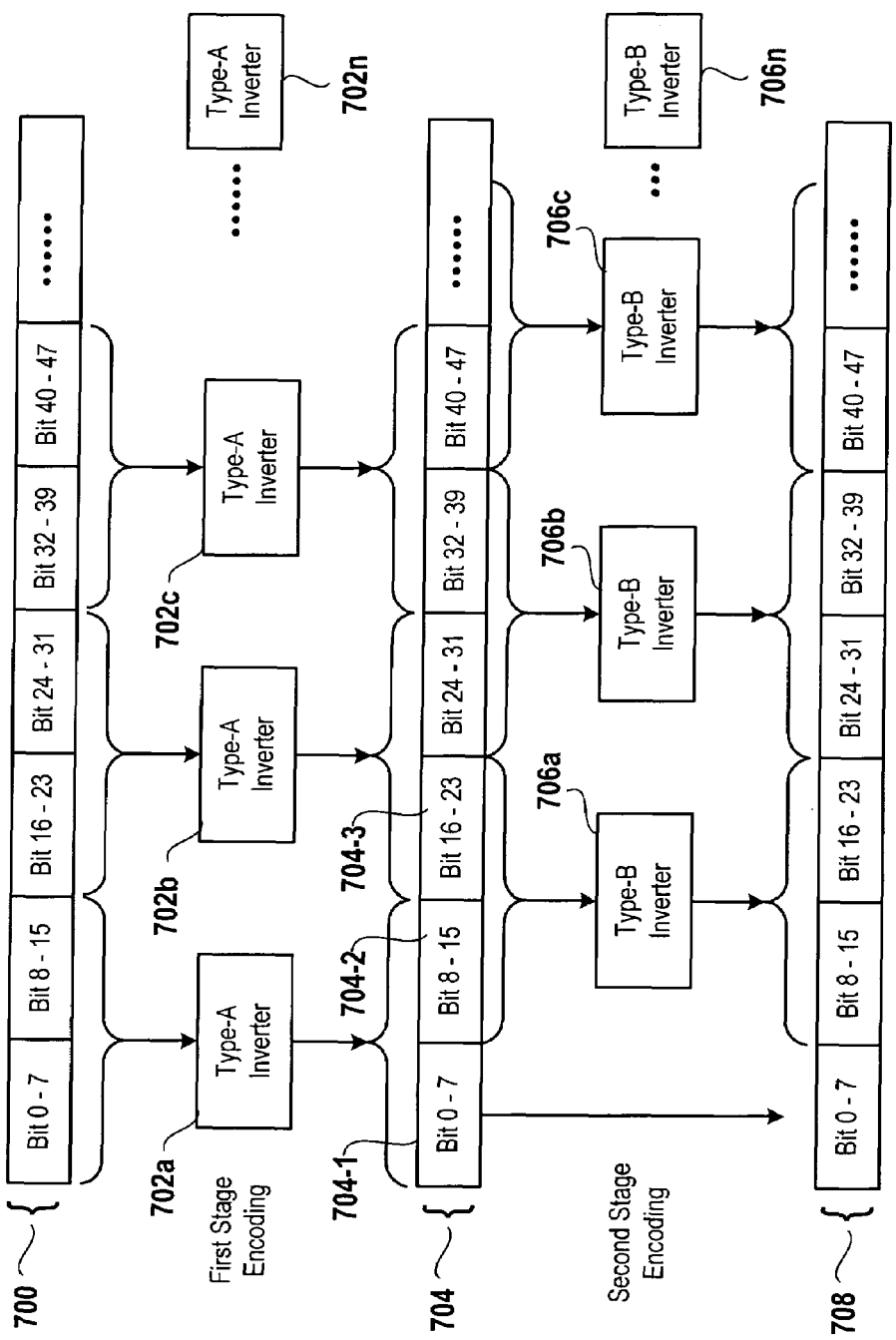
FIG. 7 is a simplified schematic diagram illustrating the data partition/selection in a two-stage selective fixed length encoding encoder in accordance with one embodiment of the invention.

FIG. 7 is a simplified schematic diagram illustrating the data partition/selection in a two-stage selective fixed length encoding encoder in accordance with one embodiment of the invention. Bit sequence 700 is provided to a plurality of inverters 702a through 702n. In one embodiment, the bit sequence is 64 bits wide and accordingly four type-A inverters would be utilized in the first stage encoding. The bit sequence 700 is subdivided into 16-bit chunks and each 16-bit portion is provided to a corresponding type-A inverter. The output from the type-A inverters 702a through 702n is provided as bit sequence 704. It should be appreciated that the embodiments described above, with reference to FIGS. 1-5 where the bit sequence is inverted if a certain number of logic high values are present in the bit sequence, is executed through type-A inverter. In the second stage encoding process, type-B inverters 706a through 706n are used to determine whether to invert the bit sequence in the second stage. However, rather than operating on the same bit sequence portions as the type-A inverter in the first stage encoding, the type-B inverters are shifted over so that the type-B inverters take a different 16-bit chunk of the bit sequence. That is, most significant bits 704-2 of the first 16-bit chunk and least-significant bits 704-3 of the second 16-bit chunk are provided to type-B inverter 706a. This pattern is repeated for the remainder of bit sequence 704. It should be noted that the least-significant bit sequence 704-1 of the first 16-bit chunk is transmitted directly to bit sequence 708 and becomes the least significant bit of bit sequence 708. The same is true for the most significant bit sequence of the last 16-bit chunk, i.e., the bit sequence is transmitted directly to bit sequence 708. As used herein, the phrase the bit sequence is transmitted directly to bit sequence 708 refers to the bit sequence not being processed through an inverter, i.e., Type-B. Type-B inverters 706a-n will then apply an inversion based on the number of logical high values within the bit sequence. It should be appreciated that the inverters provided in the TSFE embodiment are smaller and faster than those as described with regard to FIGS. 2 through 5, as the type A and B inverters handle 16 bit sequences. In one embodiment, Type-A bus-inverters 702a-n are fixed-length 16-bit inverters that invert the corresponding input data if the number of logic ones in the data is larger than 8 and adds a status bit of logic one to indicate the inversion. Type-B bus-inverters 706a-n is fixed-length 16-bit inverter that inverts the corresponding input data if the number of logic ones in the data is larger than 10 and adds a status bit of logic one to indicate the inversion. One skilled in the art will appreciate that other combinations of the threshold limitations for the inversion of the type A and B inverters, i.e., larger than 8 and larger than 10, respectively, may be used as these combination are exemplary and not meant to be limiting. In this particular embodiment where a two-stage selective fixed-length encoding optimizes data presentation by exploring the locality (spatial) property of SSN to reduce the worst SSN, will guarantee that there are no more than 10 consecutive logic ones in the encoded data and that no more than 13 logic ones are in any 16 consecutive bits in the encoded data of 2^n bits where n is any integer great than 4.

Figure 8:
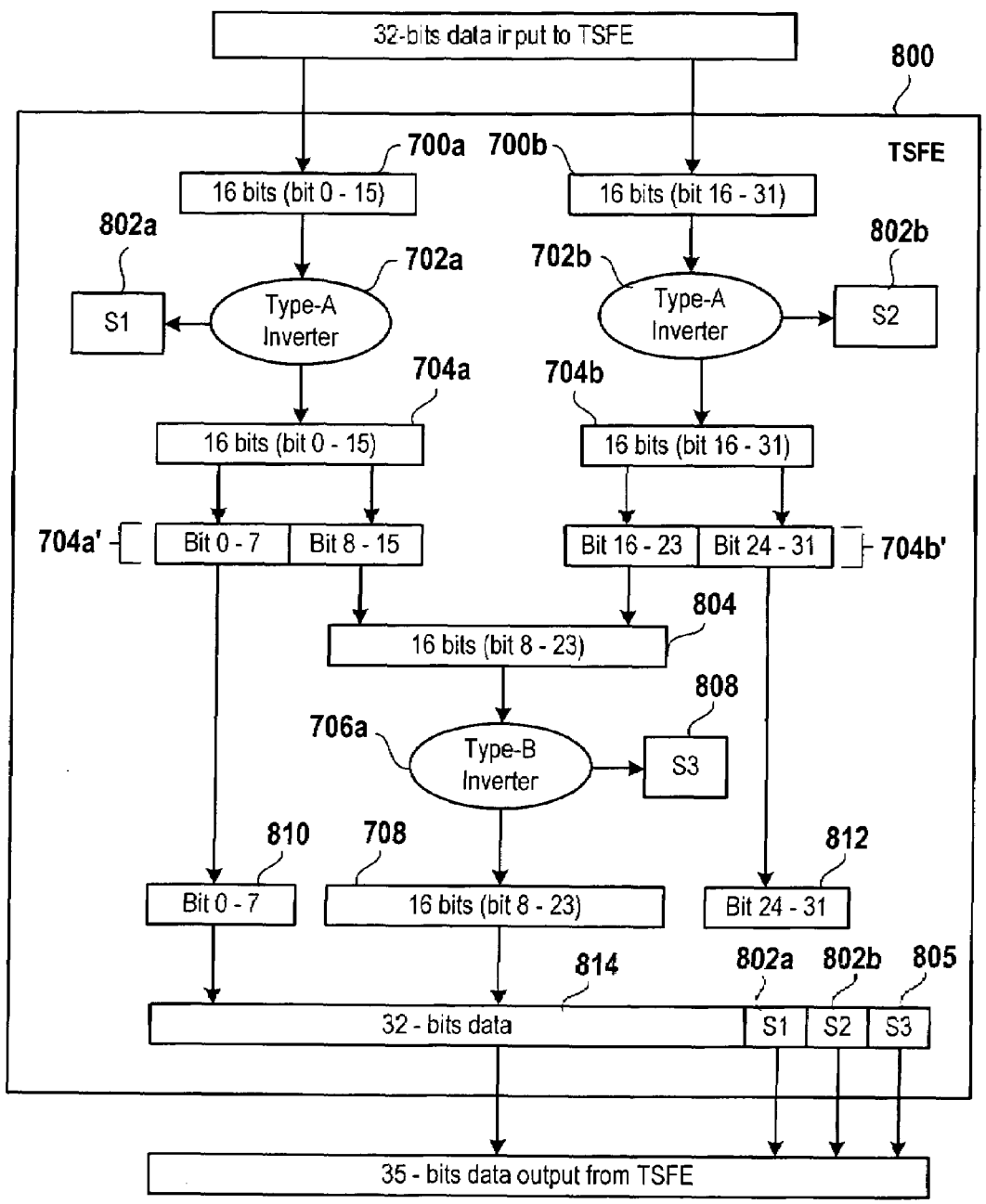
FIG. 8 is a simplified schematic diagram illustrating an alternative representation of the two-stage selective fixed length encoding encoder in accordance with one embodiment of the invention.

FIG. 8 is a simplified schematic diagram illustrating an alternative representation of the two-stage selective fixed length encoding encoder in accordance with one embodiment of the invention. For exemplary purposes, a 32-bit data input is provided to TSFE 800. The 32-bit input is subdivided into two 16-bit sequences (chunks) 700a and 700b. Bit sequence 700a is provided to type-A inverter 702a, while bit sequence 700b is provided to type-A inverter 702b. From each type-A inverter a corresponding status bit 802a and 802b is generated. It should be appreciated that status bit 802a will be used to indicate whether type-A inverter 702a inverted the 16-bit sequence 700a and status bit 802b is used to indicate whether type-A inverter 702b inverted 16-bit sequence 700b. The output 704a of type-A inverter 702a is represented as two eight-bit chunks in 704a'. The output 704b of type-A inverter 702b is represented as two eight-bit chunks in 704b'. As mentioned above, type-B inverter 706a operates on the most significant bits of data sequence 704a' (bits 8-15) and the least-significant bits of data sequence 704b' (bits 16-23). This data sequence is represented as 16 bit data sequence 804. Whether or not data sequence 804 is inverted by type-B inverter 706a is indicated by status bit S3 808. The output 708 of type-B inverter is then recombined with bit sequence portions 810 and 812 to generate a 32-bit data portion 814 with status bits S1 802a, S2 802b and S3 808 appended thereto. This combination is then output as 35-bits of data from TSFE 800. It should be noted that bit sequence 810 represents the least significant eight bit sequence for the first bit sequence 704a and that bit sequence 812 represents the most significant eight bit sequence for the last bit sequence 704b. It should be further appreciate that TSFE 800 corresponds to TSFE 303 of FIG. 6.

Table 3 illustrates one example of the benefits of the two-stage selective fixed encoding encoder in accordance with one embodiment of the invention. In Table 3, 32-bit input data D' has 19 logic ones. After the first stage inverting of the 32-bit data bit sequence $I_1'$ is generated. The two 16 bit sequences have been inverted since more than eight values of each of the sixteen bit sequence are logical ones. Status bits S1 and S2 are set to logical high values to indicate that all 32-bits have been inverted. However, the logical high values are concentrated in the middle 16-bits of the 32-bit data sequence as a result of the inversion. After the second stage process, it should be appreciated that the 16-bit middle section is operated on by the type-B inverter and because there are greater than 10 logical high values in the sequence, the data is inverted. Of course the embodiment are not limited to having greater than 10 logical values, as other limits/threshold values may be applied. This is represented by $I_2$ prime. Status bit S3 is set to a logical high value to indicate that the middle 16-bits have been inverted. S' is the combination or sequence of all three status bits, i.e., S1, S2 and S3. J' represents the combination of $I_2'$ and S'. P' is a parity bit and represents that the number of logic ones in J' is an even number. M' is the combination of J' with the parity bit P' indicating an even number of logic ones in the J' portion of M'.

TABLE 3

| | | |
|---|---|---|
| D' = | 1111.1111.0100.0000.0010.0001.1111.1111 | 32-bit input data with 19 logic ones |
| $I_1'$ = | 0000.0000.1011.1111.1101.1110.0000.0000 | After the 1st stage inverting |
| {S1, S2} | 11 | Indicts all 32 bits are inverted |
| $I_2'$ = | 0000.0000.0100.0000.0010.0001.0000.0000 | After the 2nd stage inverting |
| S3 = | 1 | Indicates the middle 16 bits are inverted |
| S' = | 111 | S' = {S1, S2, S3} |
| J' = | 0000.0000.0100.0000.0010.0001.0000.0000.111 | J' = {$I_2'$, S'} number of logic ones in J' is 6, an even number |
| P' = | 0 | |
| M' = | 0000.0000.0100.0000.0010.0001.0000.0000.1110 | M' = {J', P'}, with 6 logic ones |

Figure 9:
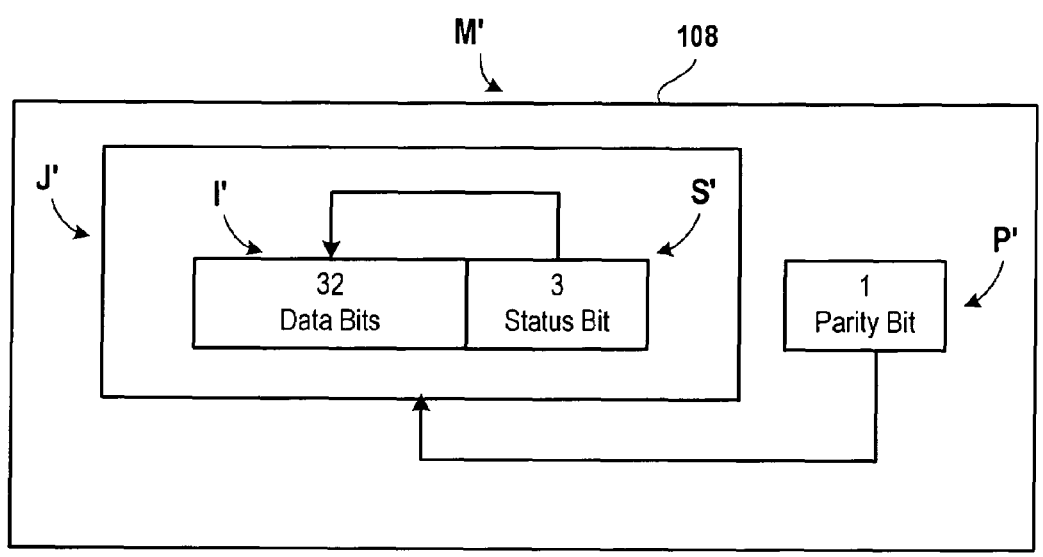
FIG. 9 is a high level exemplary data structure for data M', as presented to the external memory interface bus, described in FIG. 6 in accordance with an embodiment of the invention.

FIG. 9 is a high level exemplary data structure for data M', as presented to the external memory interface bus 112(a), described in FIG. 6 in accordance with an embodiment of the invention. Data M', as shown, include parity bit P', status bits S', and data bits I'. One skilled in the art should understand that, even though data M' is shown to include total of 35 bits, the number of bits in data M' can vary depending on the external memory interface bus size. Thus, the 35 bit size depicted in FIG. 9 is exemplary and not meant to be limiting. As described above, parity bit P' is set to a particular logical value based on the number of logical high values in data J', which includes the status bit S' and data bits I'. Consequently, errors that may occur to status bit during transmission can be detected.

Figure 10:
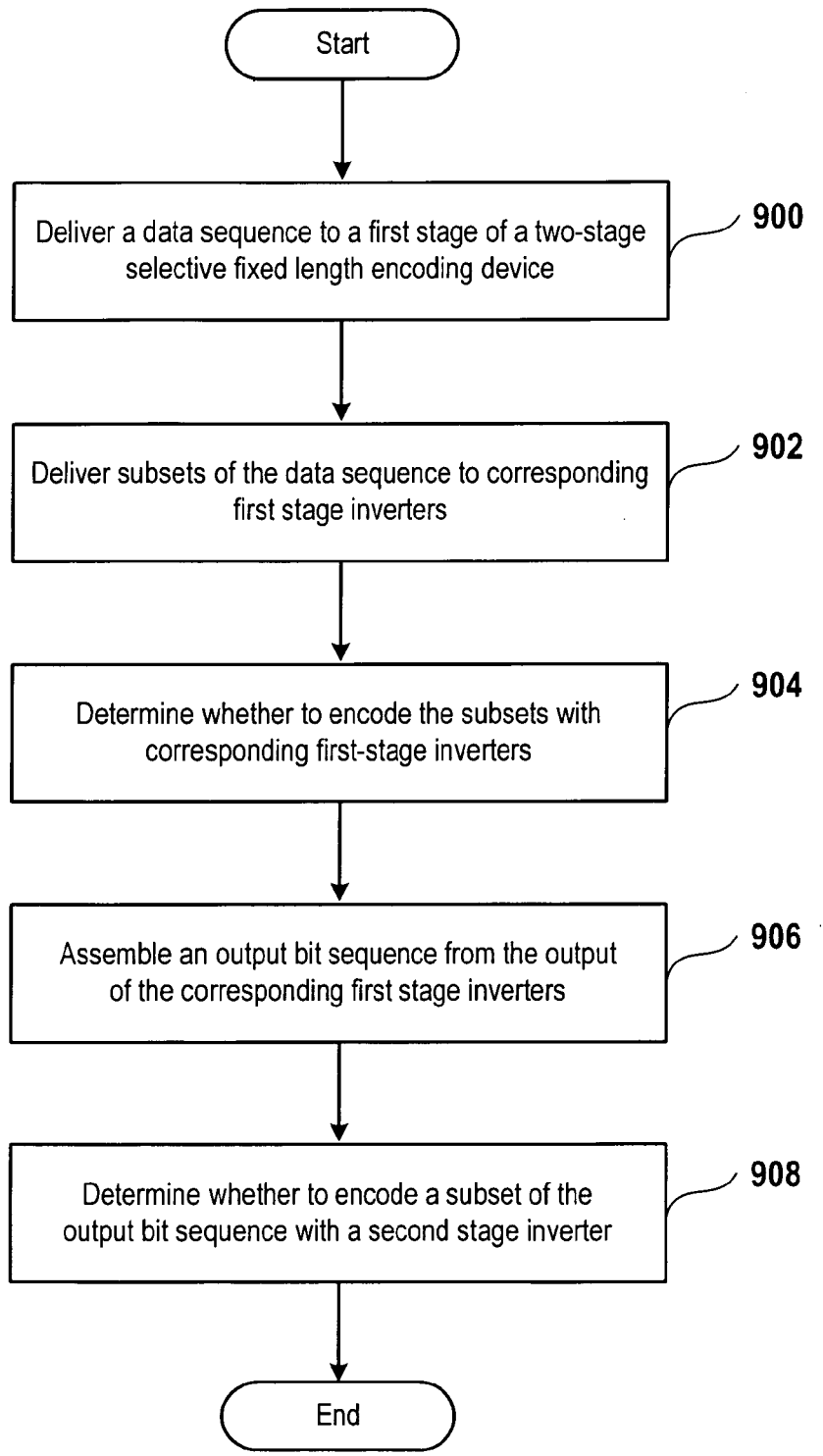
FIG. 10 is a flow chart diagram illustrating the method operations for optimizing the data sequence for presentation to an external memory in accordance with one embodiment of the invention.

FIG. 10 is a flow chart diagram illustrating the method operations for optimizing the data sequence for presentation to an external memory in accordance with one embodiment of the invention. The method initiates with operation 900 where a data sequence is delivered to a first stage of a two-stage selective fixed length encoding device. It should be appreciated that the width of the data sequence may be any suitable width such as 32 bits, 64 bits, 128 bits, etc. In one embodiment, the data width is a power of 2 where the exponent is an integer greater than 4. In another embodiment, for all data widths greater than 16 bits, the data is proportioned or divided into subsets of 8 bits. The method then proceeds to operation 902 where the subsets of the data are delivered to corresponding first stage inverters. In one embodiment, the first stage inverters are represented as the type-A inverters of FIGS. 7 and 8. Here, two 8-bit chunks that are contiguous are delivered to each inverter. The method then advances to operation 904 where it is determined whether to encode the subsets with corresponding first-stage inverters. As described above, if the 16-bits of data have greater than 8 logical high values, the inverter will encode the data by switching the bit values of the high values to a logical low value. The method then advances to operation 906 where an output bit sequence is assembled from the output of the corresponding first stage inverters. As illustrated with regard to FIGS. 7 and 8, the output of the type-A inverters are assembled as a bit sequence. The bit sequence maintains its 8-bit portions in order for the next stage of the two-stage encoder to function. For the second stage, the inverters may be thought of as being shifted over by eight bits in order to take a most significant bit sequence output from one type-A inverter and combine it with a least-significant bit sequence from a next type-A inverter. As illustrated with regard to FIGS. 7 and 8, the first bit sequence (the least significant bit sequence) from the first type-A inverter is sent directly to an output to be assembled with the output of the type-B inverters. The first type-B inverter will act on the most significant bits output from the first type-A inverter and the least significant bits output from the second type-A inverter. The type-B inverter will determine whether to encode this subset of the output bit sequence as illustrated in operation 908. Thus, as illustrated in Table 3 where the bits of the first stage inverter have a number of logical ones the second stage inverter may convert these to logical zeroes. The data output from the second stage inverters is then provided to the bus with appropriate status bits appended thereto. That is, status bits will be appended to indicate whether a corresponding inverter has inverted or encoded the bits. Thereafter, the status bits may be used to decode the bit sequence. In addition, a parity bit will be attached in order to determine or perform an error check on the data sequence. As described above, the parity bit may be set to one value when there are an even number of logic high values in the bit stream or a second value when there are an odd number of logic values in the bit stream.

The embodiments, thus far, were described with respect to PLDs. The method and system, for improving external memory interface bus data integrity, described herein may be incorporated into any suitable integrated circuit. For example, the method and system may be incorporated into other types of programmable logic devices such as programmable array logic (PAL), programmable logic array (PLA), field programmable logic array (FPLA), electrically programmable logic devices (EPLD), electrically erasable programmable logic device (EEPLD), logic cell array (LCA), just to name a few. The programmable logic device may be a part of a data processing system that includes one or more of the following components: a processor, memory; I/O circuitry, and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operations, unless explicitly stated in the claims.

What is claimed is:

1. An integrated circuit (IC) providing optimized data presentation to an external memory interface bus, comprising:
an encoder for encoding data to be sent to an external memory, the encoder having a first stage inverter and a second stage inverter, the first stage inverter capable of inverting a first portion of the data, the second stage having a second stage inverter capable of inverting a subset of output associated with the first portion of the data combined with output associated with a second portion of the data;
a parity generator connected in series with the encoder;
a parity checker; and
a decoder for decoding the data, the decoder connected in series with the parity checker.

2. The IC of claim 1, wherein the encoder includes multiple first stage encoders and multiple second stage encoders.

3. The IC of claim 1, wherein the parity generator is one of an odd parity generator or an even parity generator.

4. The IC of claim 1, wherein the encoder sets a status bit to indicate encoding of the data.

5. The IC of claim 1, wherein the parity generator includes one of a counter, an adder, or a comparator to count logical high values in the data and the status bit, and the parity generator sets a parity bit based on a number of logical high values in the data and the status bit.

6. The IC of claim 1, wherein the IC is a programmable logic device (PLD), wherein the PLD is selected from a group consisting of devices such as field programmable gate array (FPGA), programmable array logic (PAL), programmable logic array (PLA), field programmable logic array (FPLA), electrically programmable logic devices (EPLD), electrically erasable programmable logic device (EEPLD), and logic cell array (LCA).

7. A method for optimizing a data sequence for presentation to an external memory, comprising method operations of:
delivering subsets of the data sequence to corresponding first stage inverters;
determining whether to encode the subsets with corresponding first stage inverters;
assembling an output bit sequence from output of the corresponding first stage inverters;
determining whether to encode a subset of the output bit sequence with a second stage inverter; and
transmitting output of the second stage inverter to the external memory.

8. The method of claim 7, wherein the subset of the output bit sequence has a first portion output from one of the first stage inverters and a second portion output from a different one of the first stage inverters.

9. The method of claim 7, wherein if a majority of bits in the data sequence are determined to be of a first logical value type, the method includes,
  encoding the data sequence; and
  setting a status bit to the first logical value type.

10. The method of claim 7, wherein if a majority of bits are determined to be of a second logical value type, the method includes,
  maintaining the data sequence in an unencoded format in the first stage; and
  setting a status bit to a second logical value type.

11. The method of claim 7, wherein a number of first logical value types in the data sequence and status bits determines whether a parity bit is one of a logical high value type or a logical low value type.

12. The method of claim 7, further comprising:
  retrieving the data sequence from the external memory;
  separating a parity bit from the data sequence; and
  checking the parity bit to detect an error in the data sequence.

13. The method of claim 12, wherein checking the parity bit to detect the error in the data sequence includes,
  comparing the parity bit with a number of first logical value types in the data sequence to determine whether the parity bit correlates with the number of first logical value types.

14. The method of claim 12, further comprising:
  decoding the data sequence.

15. The method of claim 7, further comprising:
  assembling the output from the second stage inverter with a first portion of the output bit sequence and a last portion of the output bit sequence.

16. A method for minimizing simultaneously switching output (SSO) effect on a bus, comprising method operations of:
  counting a number of logical high values in a portion of a data sequence;
  encoding bits in the data sequence in a first stage if the number of logical high values in the data sequence is larger than one-half of a total number of bits in the data sequence;
  outputting the data sequence from the first stage to a second stage; and
  encoding bits of the data sequence in the second stage if a number of logical high values in the data sequence in the second stage is larger than one-half of a total number of bits in the data sequence.

17. The method of claim 16, wherein the method operation of encoding bits in the data sequence in the first stage and the second stage includes,
  inverting the bits in the data sequence.

18. The method of claim 16, further comprising:
  setting a status bit for each inverter performing the encoding in the first stage and the second stage; and
  setting a parity bit for output of the second stage, the parity bit being based on a number of logical high values in the output and the status bit.

19. The method of claim 16, further comprising:
  transmitting the output of the second stage over the bus;
  identifying a next data sequence to be transmitted over the bus;
  encoding bits in the next data sequence if the number of logical high values in the next data sequence is larger than half a number of bits in the next data sequence;
  comparing states of corresponding bit positions of the next data sequence with the data sequence; and
  simultaneously changing states for corresponding bit positions that are different between the next data sequence and the data sequence when going from the data sequence to the next data sequence on the external memory interface bus.

20. The method of claim 19, wherein a percentage of bits which are simultaneously changing states from logical high values to logical low values or from logical low values to logical high values is less than 50%.

* * * * *